(12) United States Patent
Marshall

(10) Patent No.: US 8,464,856 B2
(45) Date of Patent: Jun. 18, 2013

(54) QUICK CHANGE FOR TRANSFER STARWHEEL

(75) Inventor: Harold James Marshall, Forest, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 492 days.

(21) Appl. No.: 12/711,864

(22) Filed: Feb. 24, 2010

(65) Prior Publication Data

US 2010/0212385 A1 Aug. 26, 2010

Related U.S. Application Data

(60) Provisional application No. 61/202,427, filed on Feb. 26, 2009.

(51) Int. Cl.
*B65G 47/34* (2006.01)

(52) U.S. Cl.
USPC ..................... 198/459.2; 198/471.1

(58) Field of Classification Search
USPC ................ 198/459.2, 471.1, 803.5
See application file for complete search history.

(56) References Cited

U.S. PATENT DOCUMENTS

| | | |
|---|---|---|
| 1,673,236 A | 6/1928 | Fleisher |
| 3,378,285 A | 4/1968 | Staley |
| 3,418,837 A | 12/1968 | Vanderlaan et al. |
| 3,581,542 A | 6/1971 | Wahler et al. |
| 3,797,429 A | 3/1974 | Wolfe |
| 3,983,729 A | 10/1976 | Traczyk et al. |
| 4,278,711 A | 7/1981 | Sullivan |
| 4,402,202 A | 9/1983 | Gombas |
| 4,446,714 A | 5/1984 | Cvacho |
| 4,513,595 A | 4/1985 | Cvacho |
| 4,519,232 A | 5/1985 | Traczyk et al. |
| 4,547,645 A * | 10/1985 | Smith et al. .............. 219/604 |
| 4,671,093 A | 6/1987 | Dominico et al. |
| 4,697,414 A | 10/1987 | McCarty |
| 4,774,839 A | 10/1988 | Caleffi et al. |

(Continued)

FOREIGN PATENT DOCUMENTS

| | | |
|---|---|---|
| DE | 37 05 878 A1 | 9/1987 |
| DE | 39 08 394 C1 | 12/1989 |

(Continued)

OTHER PUBLICATIONS

USPTO Action on U.S. Appl. No. 12/501,135 mailed Nov. 8, 2011; 16 pages.

(Continued)

*Primary Examiner* — Mark A Deuble
(74) *Attorney, Agent, or Firm* — Nixon Peabody LLP

(57) ABSTRACT

A machine arrangement including a vacuum transfer turret assembly configured to releasably hold one or more containers and to rotate the one or more containers about the turret assembly when the one or more containers are held by the turret assembly. The turret assembly includes a shaft assembly, a starwheel assembly, and a vacuum assembly. The starwheel assembly is releasably secured to the shaft assembly. The turret assembly is adapted to, when the starwheel assembly is secured to the shaft assembly, rotate the shaft assembly to rotate the starwheel assembly relative to the vacuum assembly and when the starwheel assembly is rotatably released from the shaft assembly, enable movement of the starwheel assembly and the vacuum manifold along the shaft assembly towards and away from the vacuum assembly.

16 Claims, 8 Drawing Sheets

U.S. PATENT DOCUMENTS

| | | | |
|---|---|---|---|
| 4,808,053 A | 2/1989 | Nagai et al. | |
| 4,824,303 A | 4/1989 | Dinger | |
| H906 H | 4/1991 | Baggett et al. | |
| 5,209,101 A | 5/1993 | Finzer | |
| 5,220,993 A | 6/1993 | Scarpa et al. | |
| 5,242,497 A | 9/1993 | Miller et al. | |
| 5,249,449 A | 10/1993 | Lee et al. | |
| 5,282,375 A | 2/1994 | Lee et al. | |
| 5,344,252 A | 9/1994 | Kakimoto | |
| 5,497,900 A | 3/1996 | Caleffi et al. | |
| 5,555,756 A | 9/1996 | Fischer et al. | |
| 5,590,558 A | 1/1997 | Saunders et al. | |
| 5,611,231 A | 3/1997 | Marritt et al. | |
| 5,676,006 A | 10/1997 | Marshall | |
| 5,718,030 A * | 2/1998 | Langmack et al. | 29/426.3 |
| 5,755,130 A | 5/1998 | Tung et al. | |
| 5,771,807 A | 6/1998 | Moss | |
| 5,832,769 A | 11/1998 | Schultz | |
| 6,220,138 B1 | 4/2001 | Sakamoto | |
| 6,622,379 B1 | 9/2003 | Kano | |
| 6,637,247 B2 | 10/2003 | Bowlin | |
| 6,874,971 B2 | 4/2005 | Albaugh | |
| 7,219,790 B2 * | 5/2007 | Lanfranchi | 198/471.1 |
| 7,263,867 B2 | 9/2007 | Bartosch et al. | |
| 7,310,983 B2 | 12/2007 | Schill et al. | |
| 7,387,007 B2 | 6/2008 | Schill et al. | |
| 7,404,309 B2 | 7/2008 | Schill et al. | |
| 7,409,845 B2 | 8/2008 | Schill et al. | |
| 7,418,852 B2 | 9/2008 | Schill et al. | |
| 7,454,944 B2 | 11/2008 | Schill et al. | |
| 7,464,573 B2 | 12/2008 | Shortridge | |
| 7,530,445 B2 | 5/2009 | Marshall et al. | |
| 7,568,573 B2 * | 8/2009 | Schill | 198/441 |
| 7,805,970 B2 | 10/2010 | Woulds | |
| 2003/0063949 A1 | 4/2003 | Hohenocker | |
| 2006/0101885 A1 | 5/2006 | Schill et al. | |
| 2006/0101889 A1 | 5/2006 | Schill et al. | |
| 2007/0227859 A1 | 10/2007 | Marshall et al. | |
| 2010/0212130 A1 | 8/2010 | Marshall | |
| 2010/0212390 A1 | 8/2010 | Marshall et al. | |
| 2010/0212394 A1 | 8/2010 | Babbitt et al. | |
| 2010/0213030 A1 | 8/2010 | Green | |
| 2010/0213677 A1 | 8/2010 | Marshall | |
| 2011/0108389 A1 * | 5/2011 | Bonnain | 198/384 |

FOREIGN PATENT DOCUMENTS

| | | |
|---|---|---|
| DE | 40 23 771 | 1/1992 |
| DE | 103 19 302 B3 | 8/2004 |
| EP | 0 384 427 A1 | 8/1990 |
| EP | 1 215 430 A1 | 6/2002 |
| EP | 1 714 939 A1 | 10/2006 |
| GB | 0 235 28 | 12/1910 |
| GB | 1 042 506 | 9/1966 |
| JP | 05-038476 A | 2/1993 |
| JP | 2002-310178 | 10/2002 |
| WO | WO-88/05700 A1 | 8/1988 |
| WO | WO-90/11839 | 10/1990 |
| WO | WO-96/33032 | 10/1996 |
| WO | WO-97/37786 | 10/1997 |
| WO | WO-98/19807 A1 | 5/1998 |
| WO | WO-01/90591 A1 | 10/2002 |
| WO | WO-2006/055185 A1 | 5/2006 |
| WO | WO-2010/099067 A1 | 9/2010 |
| WO | WO-2010/099069 A1 | 9/2010 |
| WO | WO-2010/099081 A1 | 9/2010 |
| WO | WO-2010/099082 A1 | 9/2010 |
| WO | WO-2010/099165 A2 | 9/2010 |
| WO | WO-2010/099171 A1 | 9/2010 |

OTHER PUBLICATIONS

U.S. Appl. No. 11/581,787, filed Oct. 17, 2006, Marshall.
U.S. Appl. No. 11/692,564, filed Mar. 28, 2007, Marshall.
U.S. Appl. No. 11/692,584, filed Mar. 28, 2007, Schill.
International Search Report for PCT Application No. PCT/US2010/024926 dated May 27, 2010.
International Search Report for PCT Application No. PCT/US2010/024941 dated Jun. 23, 2010.
International Search Report for PCT Application No. PCT/US2010/024988 dated Jun. 14, 2010.
International Search Report for PCT Application No. PCT/US2010/024992 dated Jun. 2, 2010.
International Search Report for PCT Application No. PCT/US2010/025192 dated Jun. 18, 2010.
Partial Search Report for PCT Application No. PCT/US2010/025182 dated Jul. 14, 2010.
American National Can; Drawings showing commercially available 5811-12 necker machine and Parts List; Oct. 1993; 4 pages.
American National Can; Extracts from brochure: 5811/5811-2 Necker Flanger Reformer—Periodic Inspection and Maintenance Procedures; Apr. 22, 1994; 9 pages.
American National Can; Extracts from brochure: ANC Necker Secrets Revealed; 1996; 3 pages.
American National Can; Invoice to Hanil Can Co., Ltd dated Feb. 2, 1998; 1 page.
Notice of Opposition mailed May 12, 2010, to European Application No. 05817255.2; Patent No. 1824622.
PCT International Search Report and the Written Opinion on application No. PCT/US2010/025182 dated Sep. 28, 2010; 17 pages.

* cited by examiner

QUICK CHANGE FOR TRANSFER STARWHEEL

CROSS-REFERENCE TO RELATED PATENT APPLICATIONS

This application claims priority to Provisional U.S. Patent Application Ser. No. 61/202,427, entitled Article Processing Machine and Machine Arrangement, filed on Feb. 26, 2009, naming Harold Marshall, Dennis Shuey, Terrry Babbitt, Joseph Schill and Dennis Green as inventors, the contents of that application being incorporated herein by reference in its entirety.

BACKGROUND

The teachings herein relate generally to a series of machines or machine units which are included in a machine line, and more specifically to an apparatus which forms part of the machines/machine units and which enables the line to be quickly switched between a first set-up wherein a first sized product is modified/manufactured and at least one other set-up wherein a different sized product is modified/manufactured.

SUMMARY

An embodiment includes machines used to form a neck on containers, including beer and other beverage cans or bottles, which provides high speed precision necking that is reliably realized. The present inventor has identified a drawback when switching from a production run of one sized container to another sized container, such as, for example, a run where a can is produced which is 5 inches tall, and another run where a can is produced which is 6 inches tall, in that the downtime tends to be considerable and/or the number of steps and tools required to execute the switching operation is considerable, etc. For example, a change-over may require the switching of an extensive number of elements and replacing them with new elements and/or re-adjusting current elements to accommodate the new length of the next can to be necked.

In an embodiment, there is a machine arrangement that comprises a vacuum transfer turret assembly adapted to releasably hold one or more containers and to rotate the one or more containers about a rotation axis of the turret assembly when the one or more containers are held by the turret assembly. The turret assembly includes a shaft assembly, a starwheel assembly, a vacuum manifold and a vacuum assembly. The starwheel assembly is releasably secured to the shaft assembly. Rotation of the shaft assembly is configured to rotate the starwheel assembly relative to the vacuum assembly when the starwheel assembly is secured to the shaft assembly. The starwheel assembly and the vacuum manifold are configured to move along the shaft assembly in a direction of the axis of rotation of the turret assembly towards and away from the vacuum assembly when the starwheel assembly is released from the shaft assembly and while the starwheel assembly is captured between the vacuum assembly and an outboard end of the turret assembly. The starwheel assembly is moved to accommodate a container of a different length.

In another embodiment, a method is provided. The method comprises identifying a vacuum transfer turret assembly of a machine adapted to process containers. The turret assembly includes a starwheel assembly and a shaft assembly. The starwheel assembly is secured to the shaft assembly at a first location relative to the shaft assembly such that the starwheel assembly does not move relative to the shaft assembly. The method further includes releasing the starwheel assembly from the shaft assembly so that the starwheel assembly can slide in an axial direction of the shaft assembly relative to the shaft assembly and can rotate relative to the shaft assembly while the starwheel assembly is retained on the shaft assembly. The method further includes moving the starwheel assembly inboard in the axial direction of the shaft assembly a first distance from the first location, placing a spacer on the shaft assembly so that the spacer is positioned outboard of the turret assembly with respect to the starwheel assembly, and securing the starwheel assembly to the shaft assembly by imparting a clamping force between a starwheel assembly mounting hub, the spacer and the starwheel assembly to secure the starwheel assembly at a second location relative to the shaft assembly further inboard than the first location.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION OF SOME EMBODIMENTS

Figure 1:
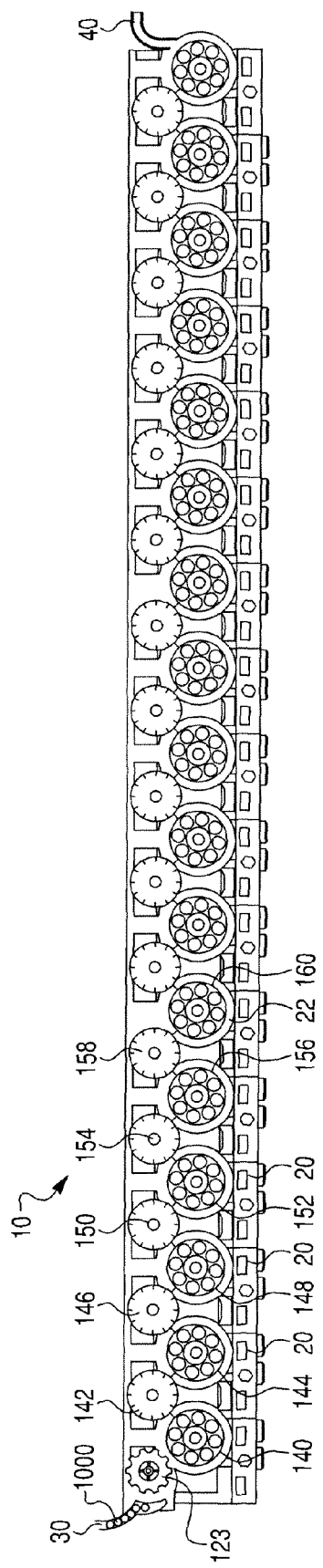
FIG. 1 presents a side view of a machine line according to an embodiment.

In a first embodiment, referring to FIG. 1, there is a machine line 10 which is adapted to perform a necking, flanging, or other processing step on containers and/or embryonic containers (hereinafter container refers to both containers and embryonic containers), such as, for example and not by way of limitation, cans or bottles, as the containers pass through a series of turret necking stations 20 in a serpentine path. As may be seen, the containers 1000 enter the machine line 10 via a can in-feed 30 and then, after passing through the infeed transfer starwheel, are "picked up" by a first transfer starwheel 140. In some embodiments, the transfer starwheel 140 has 20 pockets to hold the cans, which is more pockets than the infeed transfer starwheel. The containers 1000, which are held in position on this first transfer starwheel 140 using a pneumatic pressure differential or "suction," orbit about the rotational axis 206 of the starwheel (see FIG. 3, more on this below) so that the containers are transferred about at least a portion of the first transfer starwheel 140. In the embodiment depicted in FIG. 1, the containers 1000 are passed from the first transfer starwheel unit 140 to a first processing turret 142 and enter into a first stage of necking on the machine line 10.

Figure 2:
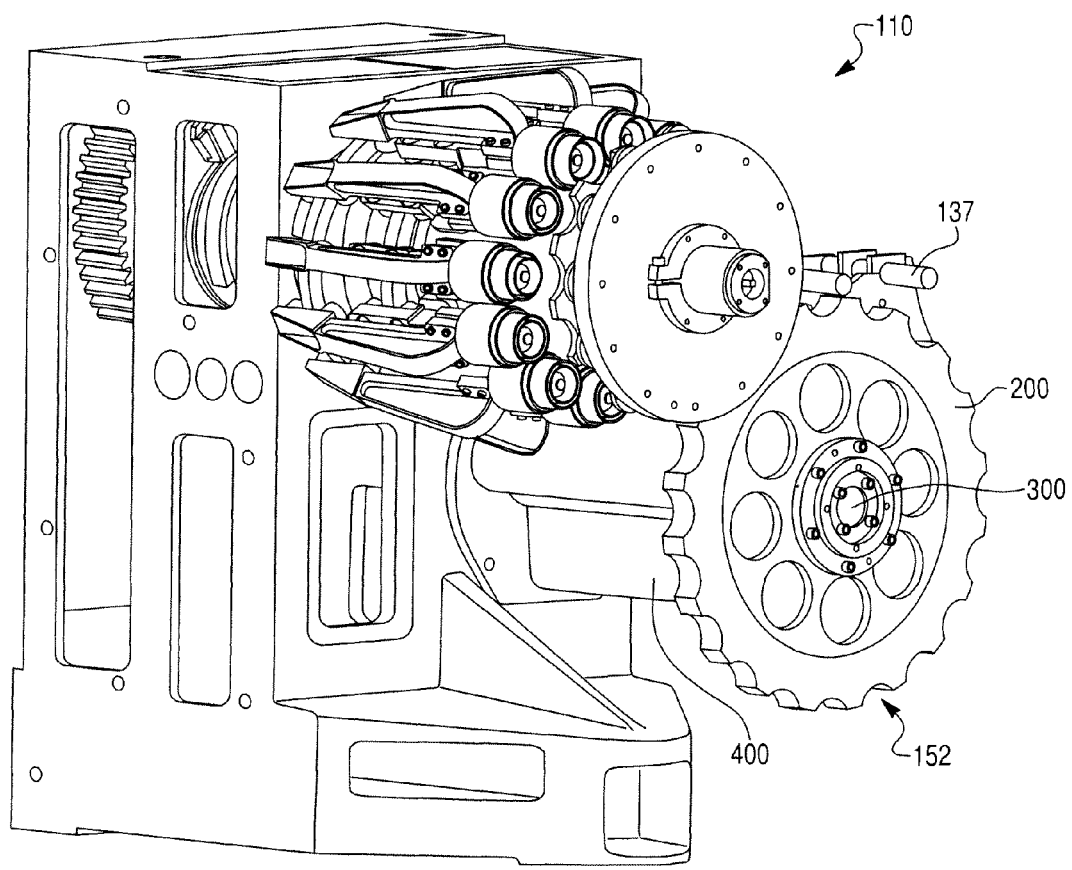
FIG. 2 presents an isometric view of a portion of the machine line of FIG. 1.

It is briefly noted that some embodiments are such that necking machines 10 are constructed from a series of modules 110. An example of such a module 110 is shown in FIG. 2. The use of modules 110 allows for the machine line 10 to be assembled/changed to provide as many necking stages as is required and to allow for the addition of additional stages such as flanging and/or base reforming/reprofiling which are carried out following the basic necking operations, to be added/removed as desired.

In the embodiment depicted in FIG. 1, the containers travel from the first transfer starwheel unit 140 to the first processing turret 142 to the second transfer starwheel unit 144 (which, in some embodiments, has the same number of pockets as the starwheel unit 140) to the second processing turret 146 to the third transfer starwheel unit 148 to the third processing turret 150 to the fourth transfer starwheel unit 152 to the fourth processing turret 154 to the fifth transfer starwheel unit 156 to the fifth processing turret 158 to the sixth transfer starwheel unit 160 and so on for as many transfer starwheel units and/or turrets that are in the machine line 10, and then onto the exit 40. Modules 110 may be instated into the line 10 to provide the turrets 140, 144, 148, 152 and 156, respectively.

Figure 3:
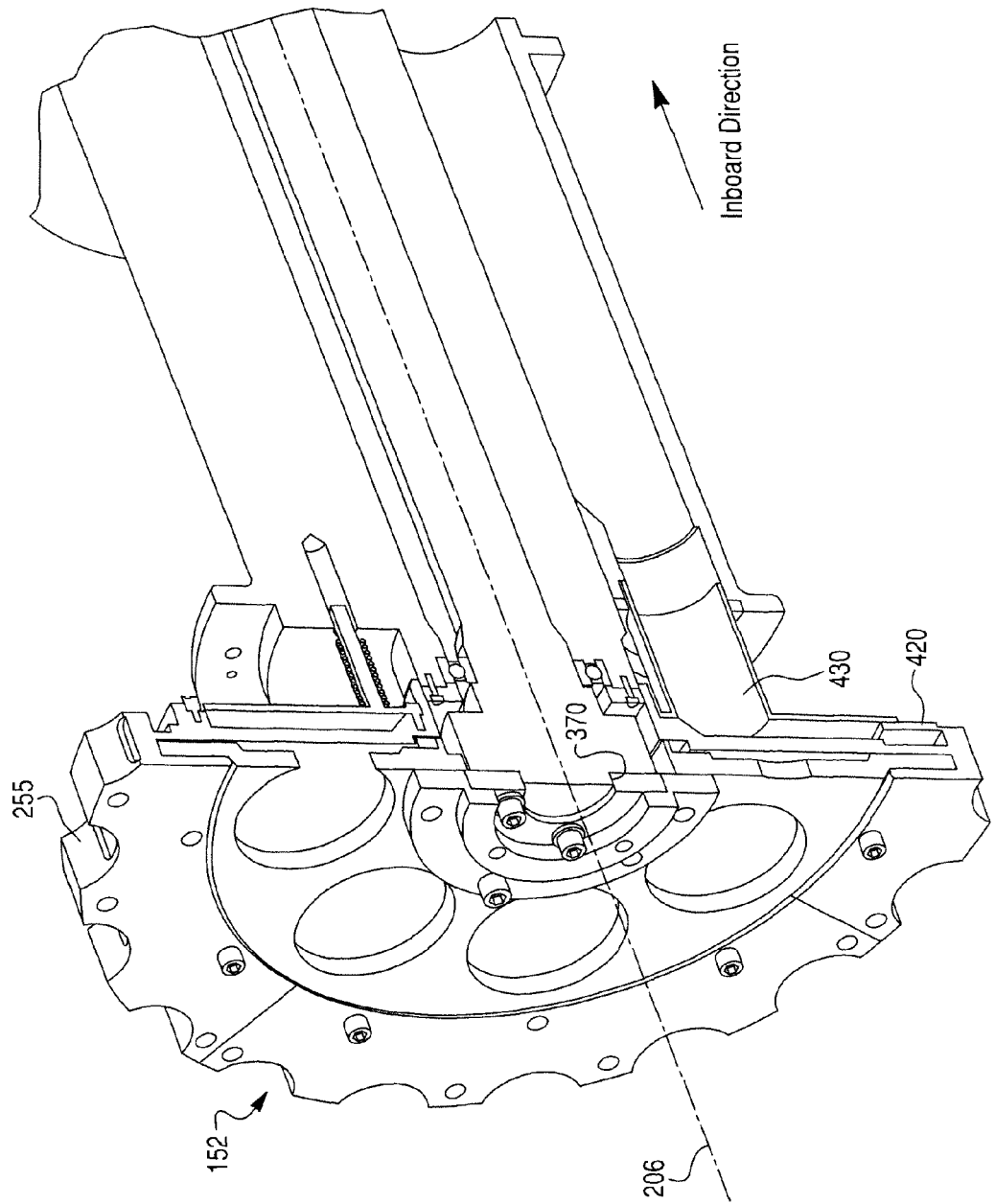
FIG. 3 presents an isometric cross-sectional view of a portion of the machine depicted in FIG. 2.
Figure 4:
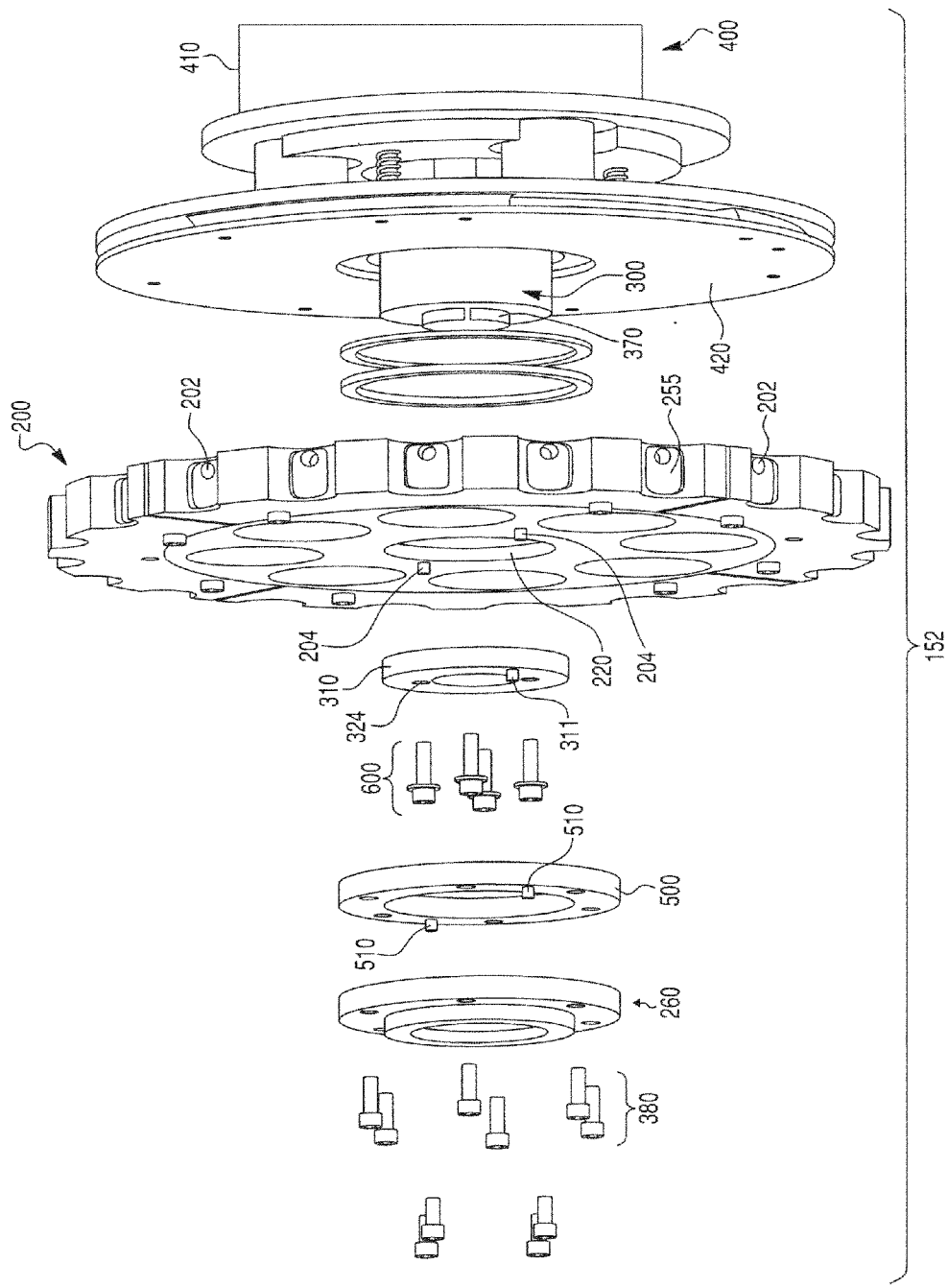
FIG. 4 presents an exploded view of the components depicted in FIG. 3.

FIG. 3 depicts a cross-section of an isometric view of an exemplary vacuum transfer turret assembly 152, and FIG. 4 depicts an exploded view of that vacuum transfer turret assembly 152. Features of this embodiment will now be described.

In the exemplary embodiment depicted in the figures, the vacuum transfer turret assembly 152 includes a starwheel assembly 200 (see, e.g., FIGS. 2 and 4) that is adapted to releasably hold (i.e., hold and release on command) one or more containers and/or embryonic containers through the use of a vacuum created at orifices 202. Specifically, when a container is placed into close proximity of the orifices 202 (e.g., a cylindrically shaped container may lie in the "cradle" 255, where the respective orifice 202 is adjacent the cylindrical surface of the container) suction applied to the container through the orifice 202 "holds" the can in the respective cradle 255, permitting the starwheel assembly 200 to rotate the container about rotation axis 206 of the turret assembly 152/rotation axis 206 of the starwheel assembly 200 when the container is held by the turret assembly 152. In some embodiments, the turret assembly 152 is adapted to hold multiple containers in respective cradles 255 by the suction applied through respective orifices 202.

The turret assembly 152 includes a shaft assembly 300, onto which the starwheel assembly 200 is mounted (FIG. 4). The starwheel assembly 200 is releasably secured to the shaft assembly 300. That is, when the turret assembly 152 is configured for necking or other operations, the starwheel assembly 200 is secured to the shaft assembly 300 such that one rotation of the shaft assembly 300 causes a corresponding rotation of starwheel assembly 200, and the starwheel assembly 200 does not move in the inboard and/or outboard direction along the shaft assembly 300. However, when the starwheel assembly 200 is released (decoupled) from the shaft assembly 300, the starwheel assembly 200 may be rotated relative to the shaft assembly 300 while the shaft assembly 300 supports the starwheel assembly 200 in the direction of gravity. The starwheel assembly 200 may be slid or otherwise moved in the direction of axis 206 (inboard and outboard), relative to the shaft assembly 300, when released from the shaft assembly 300. The starwheel assembly 200 is configured to slide along the shaft assembly 300 (when released from the shaft assembly 300) to adjust the position of the starwheel assembly 200 to accommodate containers 1000 of different length.

The turret assembly 152 depicted in the figures includes a vacuum assembly 400 which applies the suction through orifices 202 discussed above. This vacuum assembly 400 includes a vacuum housing 410, a vacuum manifold 420 and vacuum tubes 430. The vacuum tubes 430 connect the vacuum housing 410 to the vacuum manifold 420 such that a vacuum present in the vacuum housing 410 is "transferred" through the vacuum tubes 430 to the vacuum manifold 420 and then to the orifices 202, thereby creating the suction through orifices 202. The valve assembly 400 is configured to maintain communication with the starwheel assembly 200 at varying axial positions.

In an exemplary embodiment, the turret assembly 152 is adapted to, when the starwheel assembly 200 is secured/coupled/connected to the shaft assembly 300, rotate the shaft assembly 300 to rotate the starwheel assembly 200 relative to the vacuum assembly 400. That is, in the embodiment depicted in the figures, the starwheel assembly 200 and the shaft assembly 300 rotate relative to the vacuum assembly 400. It is noted that in other embodiments, some portions of the vacuum assembly 400 may rotate with the starwheel assembly 200 and/or the shaft assembly 300. By way of example only and not by way of limitation, the manifold 420 and/or the vacuum tubes 430 may rotate with the starwheel assembly 200 and/or the shaft assembly 300, an interface being provided between the vacuum tubes 430 and the vacuum housing 410 analogous to the interface provided by the vacuum manifold 420 and the starwheel assembly 200. In some embodiments, the vacuum housing 410, the vacuum manifold 420 and the vacuum tubes 430 may rotate with the starwheel assembly 200 and/or the shaft assembly 300, an interface being provided between the vacuum housing 410 and inboard portions of the module 110 analogous to the interface provided by the vacuum manifold 420 and the starwheel assembly 200, although in some embodiments, an independent vacuum source may be mounted on the vacuum housing 410, negating the analogous interface with the inboard portions of the module 110.

Figure 5:
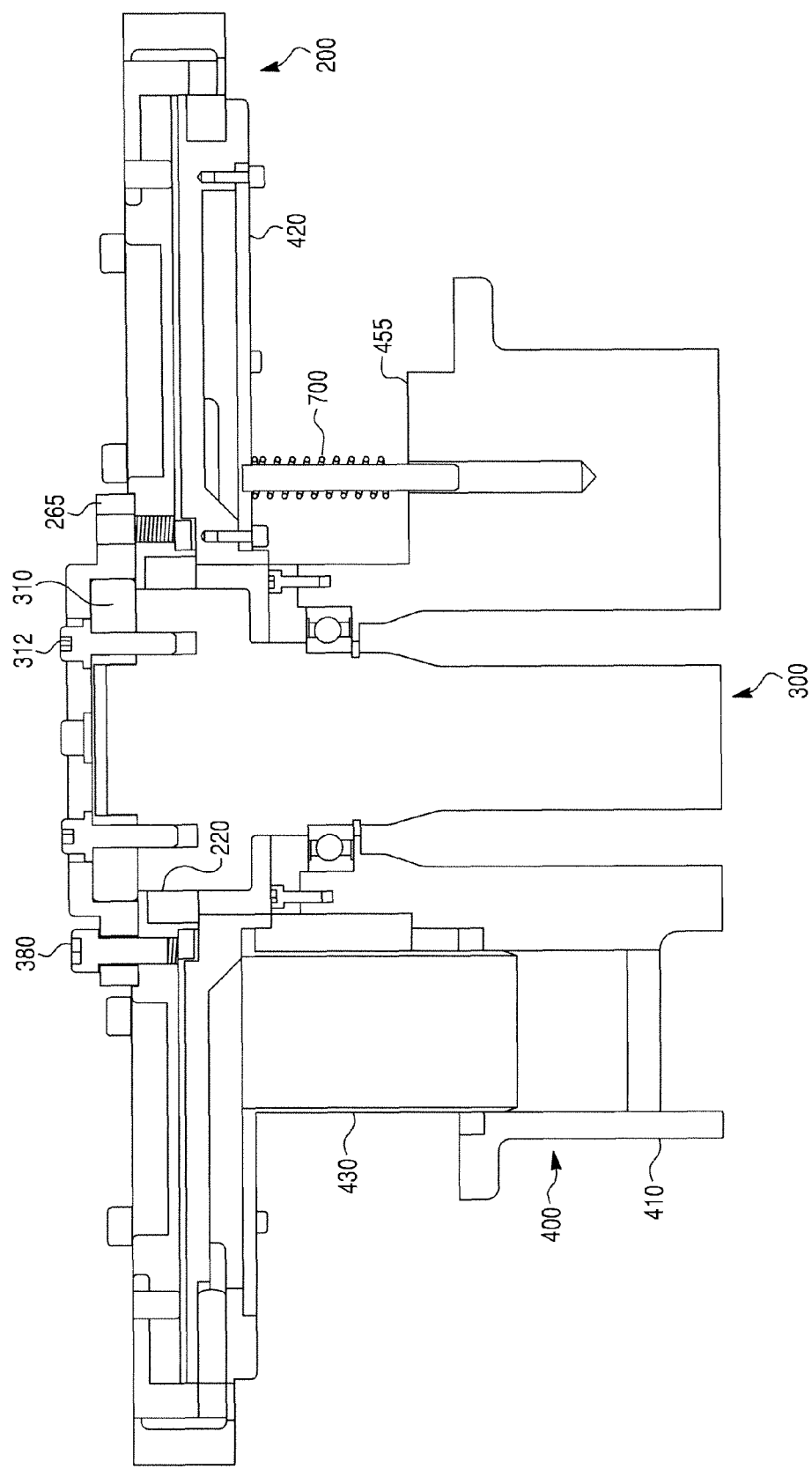
FIG. 5 presents a side view of the components depicted in FIG. 4.
Figure 6:
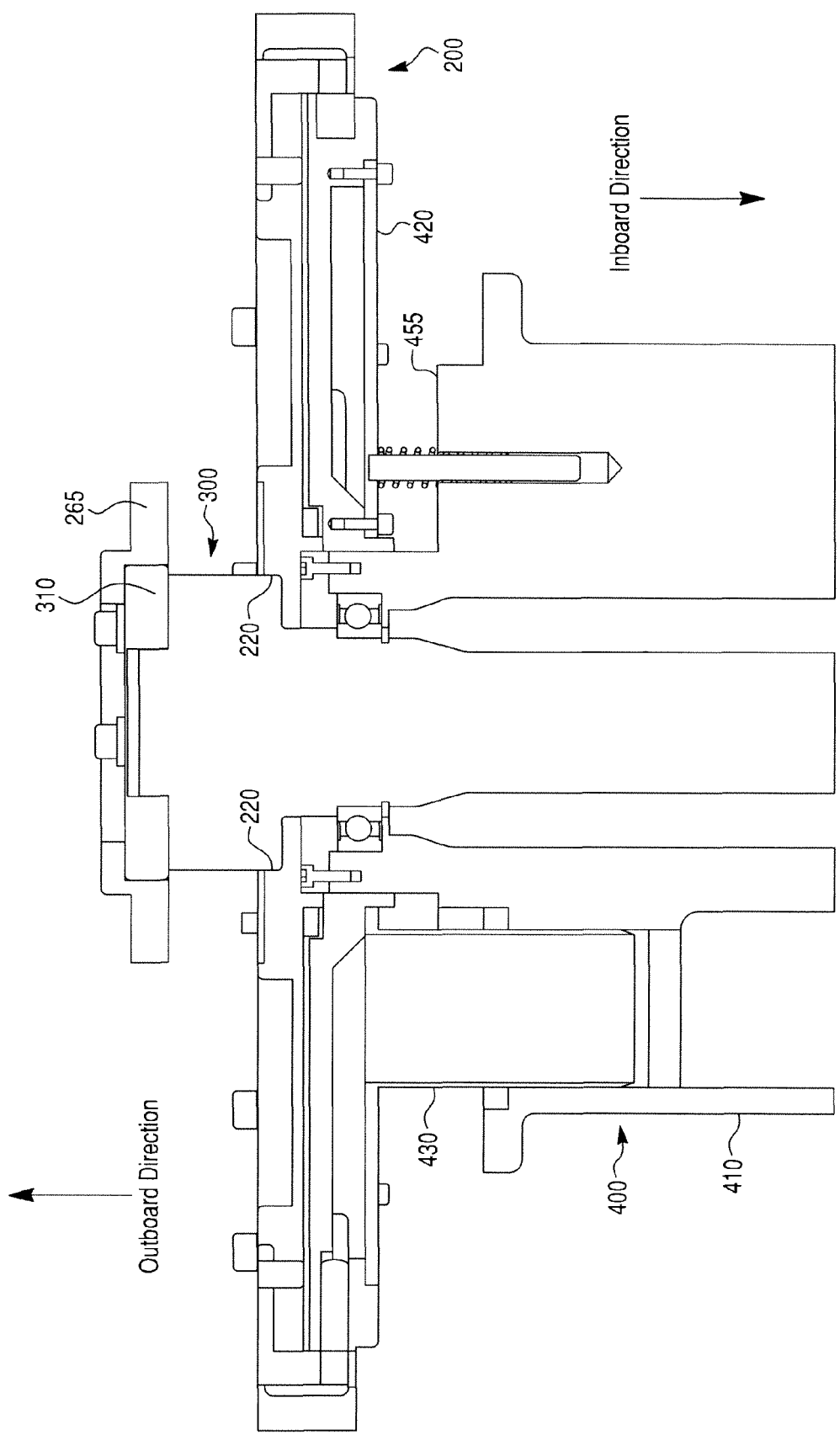
FIG. 6 presents a side view of the components depicted in FIG. 4, except that the starwheel assembly is moved inboard with respect to its position depicted in FIG. 5.

In some embodiments, the turret assembly 152 is adapted to, as may be seen in FIGS. 5 and 6, when the starwheel assembly 200 is released from the shaft assembly 300, enable movement of the starwheel assembly 200 and the vacuum manifold 420 and the vacuum tubes 410 along the shaft assembly 300 in the longitudinal direction (e.g., the direction of the rotation axis 206) of the shaft assembly 300 towards and away from the vacuum housing 410 while the starwheel assembly 200 is captured between the vacuum assembly 400 and an outboard end of the turret assembly 152. The outboard end of the turret assembly 152 includes a starwheel retainer hub 310 mounted on an end of the shaft assembly 300 opposite the vacuum assembly 400, which serves as an ultimate limit of the travel of the starwheel assembly 200 away from the inboard end of the turret assembly 152. (Note that the starwheel assembly 200 is released from the shaft assembly 300 even though the starwheel retainer hub 310 prevents the starwheel assembly 200 from being removed from the shaft assembly 300. Any design where the starwheel assembly 200 may be adjusted with respect to the shaft assembly 300 and then secured to the shaft assembly 300 may be utilized in some embodiments.) In the embodiment depicted in the Figs., the vacuum housing 410 stops the travel of the starwheel assembly 200 towards the inboard end of the turret assembly 152, with springs 700 slowing the movement of the starwheel assembly 200 towards the inboard end of the turret assembly 152. In some embodiments, springs 700 are provided to provide a cushion for the starwheel assembly 200 against the vacuum assembly 400 and/or provide a force that pushes the starwheel assembly 200 away from the vacuum assembly 400.

By way of example only and not by way of limitation, movement and limitation of movement of the starwheel assembly 200 along the shaft assembly may be characterized by describing, relative to the axis of rotation of the turret assembly 206, movement of the starwheel assembly to a plurality of locations a respective plurality of distances from a reference component on the vacuum assembly and/or the shaft assembly (e.g., any relatively stationary component that may be used as a reference point) sufficiently inboard with respect to the range of movement of the starwheel assembly 200. These plurality of distances may be bracketed on one end by a distance equal to a first distance between the reference component and a limit of travel of the starwheel assembly in the outboard direction of the turret assembly and bracketed on another end by a distance equal to a second distance between the reference component and a limit of travel of the starwheel assembly 200 in the inboard direction of the turret assembly 152, all of these distances being taken on the axis of rotation 206 of the turret assembly 152.

In some embodiments, the turret assembly 152 is adapted to, when the starwheel assembly 200 is released from the shaft assembly 300, enable movement of the starwheel assembly 200 and the vacuum manifold 420 along the shaft assembly 300 in the longitudinal direction/direction of the axis of rotation 206 through a range of distances towards and from the vacuum housing 410 along the shaft assembly 300. A high end of the range of distances is set by a first limit of travel of the starwheel assembly 200 along the shaft assembly 300 relatively proximate to an outboard end of the turret assembly/relatively proximate to an end of support for the starwheel assembly in the direction of gravity. A low end of the range of distances is set by a second limit of travel of the starwheel assembly 200 along the shaft assembly 300 when the starwheel assembly 200 is moved in the direction of the inboard end of the turret assembly 152.

In some embodiments, the first limit of travel of the starwheel assembly 200 along the shaft assembly 300 is set by the starwheel assembly retainer hub 310. In some embodiments, the second limit of travel of the starwheel assembly 200 along the shaft assembly relatively towards the inboard end of the turret assembly is set by the vacuum assembly 400. By way of example only and not by way of limitation, referring to FIGS. 3, 5 and 6, etc., the vacuum housing 410 has a shoulder 455, and a face of the vacuum manifold 420 facing the vacuum housing 410 may contact the shoulder 455 (or, an intermediate "bumper" or the like installed between the shoulder 455 and the manifold 420, thus preventing further movement in the inboard directions. In other embodiments, the vacuum assembly 400 sets the second limit of travel of the starwheel assembly 200 by causing the springs 700 to "bottom out" (e.g., to fully compress) or otherwise be compressed a sufficient amount that no further movement of the starwheel assembly 200 in the inboard direction is feasible.

In some embodiments, the retainer hub 310 used to set the first limit of travel is bolted or otherwise secured to the shaft assembly 300 by bolts 312. By way of example only and not by way of limitation, the starwheel assembly 200 depicted in the figures includes a bore 220 through which a shaft of the shaft assembly 300 extends. A diameter of the interior of the bore 220, taken on a first plane normal to the longitudinal direction of the shaft assembly 300/the axis of rotation of the turret assembly 152/starwheel assembly 200, is smaller than an outer diameter of the retainer hub 310, taken on a second plane parallel to the first plane, where the retainer hub 310 is coaxial with the axis of rotation 206. This difference in diameters is significant enough to retain the starwheel assembly 200 on the shaft assembly 300. That is, in some embodiments, it prevents the starwheel assembly 200 from travelling in the outboard direction of the shaft assembly 300 beyond the point at which the shaft assembly 300 no longer supports the starwheel assembly 200 in the direction of gravity, thus preventing the starwheel assembly 200 from falling off the shaft assembly 300.

In some embodiments, an intermediate device is positioned between the retainer hub 310 and the starwheel assembly 200. In some embodiments, this intermediate device may be a resilient material that functions in a manner analogous to the spring 700 between the shoulder 455 and the manifold 420 of the vacuum assembly 400. By way of example only and not by way of limitation, a helical spring may be wound tightly around the shaft assembly 300 between the retainer hub 310 and the starwheel assembly 200, one end of the helical spring reacting against the retainer hub 310.

In an exemplary embodiment, the aforementioned first limit of travel of the starwheel assembly 200 along the shaft assembly 300 relatively proximate to the outboard end of the turret assembly 152 is based on an end of support by the turret assembly 152 in the gravitational direction for the starwheel assembly 200. The aforementioned second limit of travel, in this and/or in another exemplary embodiment, is a limit of movement of the starwheel along the shaft assembly 300 relatively proximate to an inboard end of the turret assembly 152. This second limit may be set by the vacuum assembly and/or may be set by other components.

Referring to the Figs., a starwheel mounting hub 260 is positioned at the outboard end of the turret assembly 152. The starwheel mounting hub 260 is adapted to be secured to the shaft assembly 300 and the starwheel assembly 200. The starwheel mounting hub 260 forms part of a starwheel alignment system that is adapted to align the starwheel mounting hub 260 with the shaft assembly 300, and align the starwheel mounting hub 260 with the starwheel assembly 200 so as to rotationally align the starwheel assembly 200 relative to the shaft assembly 300 such that the starwheel assembly 200 can only be secured to the shaft assembly 300 within a precisely defined angle relative to each other.

In an exemplary embodiment utilizing an exemplary starwheel alignment system, the retainer hub 310 forms the "bearing" to which the other components are linked during the alignment system. That is, the retainer hub 310 is rotated about the shaft assembly 300 to align the system. In this regard, the alignment system includes a starwheel retainer hub 310 that is provided with a dowel pin 311 which fits into a bore of the starwheel mounting hub 260 (not shown). This dowel pin 311 forces any rotation of the mounting hub 260 to be transmitted to the retainer hub 310. The starwheel assembly 200 includes dowel pins 204 which fit into corresponding bores of the mounting hub 260, thus forcing any rotation of the mounting hub 260 to be transmitted to the starwheel assembly 200, and visa-versa. Accordingly, any rotation of the starwheel assembly 200 will cause a corresponding rotation of the retainer hub 310. The dowel pins 204 are configured to maintain radial orientation of the starwheel assembly 200 with the adjacent processing assembly when the spacer 500 is removed or replaced with a different size spacer. Radial orientation ensures that the cradles 255 of the starwheel assembly 200 are synchronized with cradles of the adjacent processing assembly. The retainer hub 310 is centered on an alignment cylinder 370 of the shaft assembly 300, thus providing the corresponding bearing surface to the retainer hub 310.

The retainer hub 310 includes slots 324 through which bolts 600 are fitted to secure the retainer hub 310 to the shaft assembly 300. In an exemplary embodiment, the slots 324 permit the retainer hub 310 to rotate relative to the alignment cylinder 370 of the shaft assembly 300 a distance corresponding to the radial distance of the slots 324, when the bolts 600 are loose (I.e., the bolts do not exert a significant clamping force that would clamp the retainer hub 310 to the shaft assembly 300, thus preventing rotation of the retainer hub relative to the shaft assembly 300). When the bolts 600 hit the ends of the slots 324, the retainer hub 310 cannot rotate any further. This rotation, limited by slots 324, permits approximate synchronization of the shaft assembly 300 with an adjacent processing assembly. For example and not limitation, in the alignment system, the retainer hub 310 is permitted to rotate a limited amount in the counterclockwise and/or clockwise direction such as, for example, 0 to 18 degrees relative to the shaft assembly 300, due to the slots 324, so that the precise alignment of the starwheel assembly 200 with an adjacent processing assembly may be achieved (as will be described below), after which the bolts 600 are tightened to exert a sufficient clamping force onto the retainer hub 310 to prevent the retainer hub 310 from rotating about the alignment cylinder 370, and, because the starwheel assembly 200 is linked, through the starwheel mounting hub 260, to the retainer hub 310, the starwheel assembly 200 is thus prevented from rotating about the alignment cylinder 370 as well. Thus, the retainer hub 310 prevents the starwheel assembly 200 from moving in the outboard direction when there is no spacer 500. Thus, the starwheel assembly 200 is rotationally aligned with the shaft assembly 300.

In an exemplary embodiment, the mounting hub 260 is configured with mounting ring 265, which has a surface that faces the starwheel assembly 200 and interfaces with the starwheel assembly 200. In an exemplary embodiment, the mounting ring 265 includes the bore into which the dowels 204 of the starwheel assembly 200 are inserted. In some embodiments, the mounting hub 260, via the mounting ring 265, prevents the starwheel assembly 200 from traveling to the first limit, establishing a third limit of travel, and is dimensioned/designed to position the starwheel assembly 200 at location(s) long the shaft assembly 300 accurately, as detailed herein. In some embodiments, as may be seen in FIG. 5, the starwheel assembly 200 is fitted directly against the mounting ring 265 of the mounting hub 260, thus positioning the starwheel assembly 200 at the third limit of travel. That is, the mounting hub 260 serves to fix the location of the starwheel assembly 200 along the length of the shaft assembly 300. In this regard, bolts 380 are provided which pass through the mounting hub 260 and into the starwheel assembly 200, as may be seen in FIG. 5. The bolts 380 have a shoulder between the head and the threads, and the male threads of the bolts 380 interface with the female threads of the starwheel assembly 200. When the bolts are tightened, the starwheel assembly 200 is clamped to the mounting hub 260, and thus the starwheel assembly is prevented from moving in the inboard direction and the outboard direction. In some embodiments, however, the hub 260 is configured such that the retainer hub 310 sets the position of the starwheel assembly 200 in the outboard direction and inboard directions, once the bolts 380 are tightened to pull the starwheel assembly 200 towards the hub 310.

Figure 7:
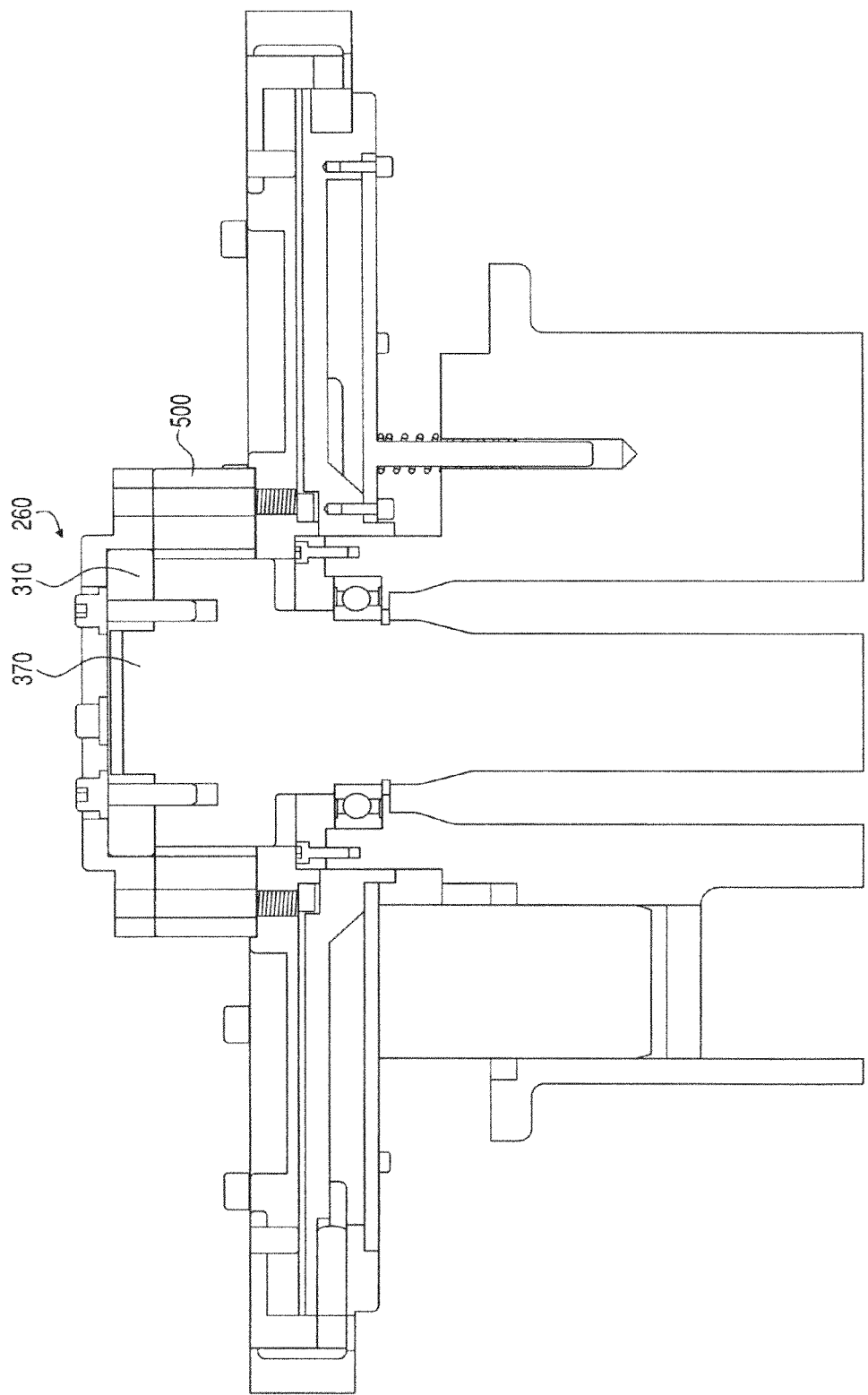
FIG. 7 presents a side view of the components depicted in FIG. 4, except that the starwheel assembly is moved inboard with respect to its position depicted in FIG. 5, and a spacer has been added to the assembly.
Figure 8:
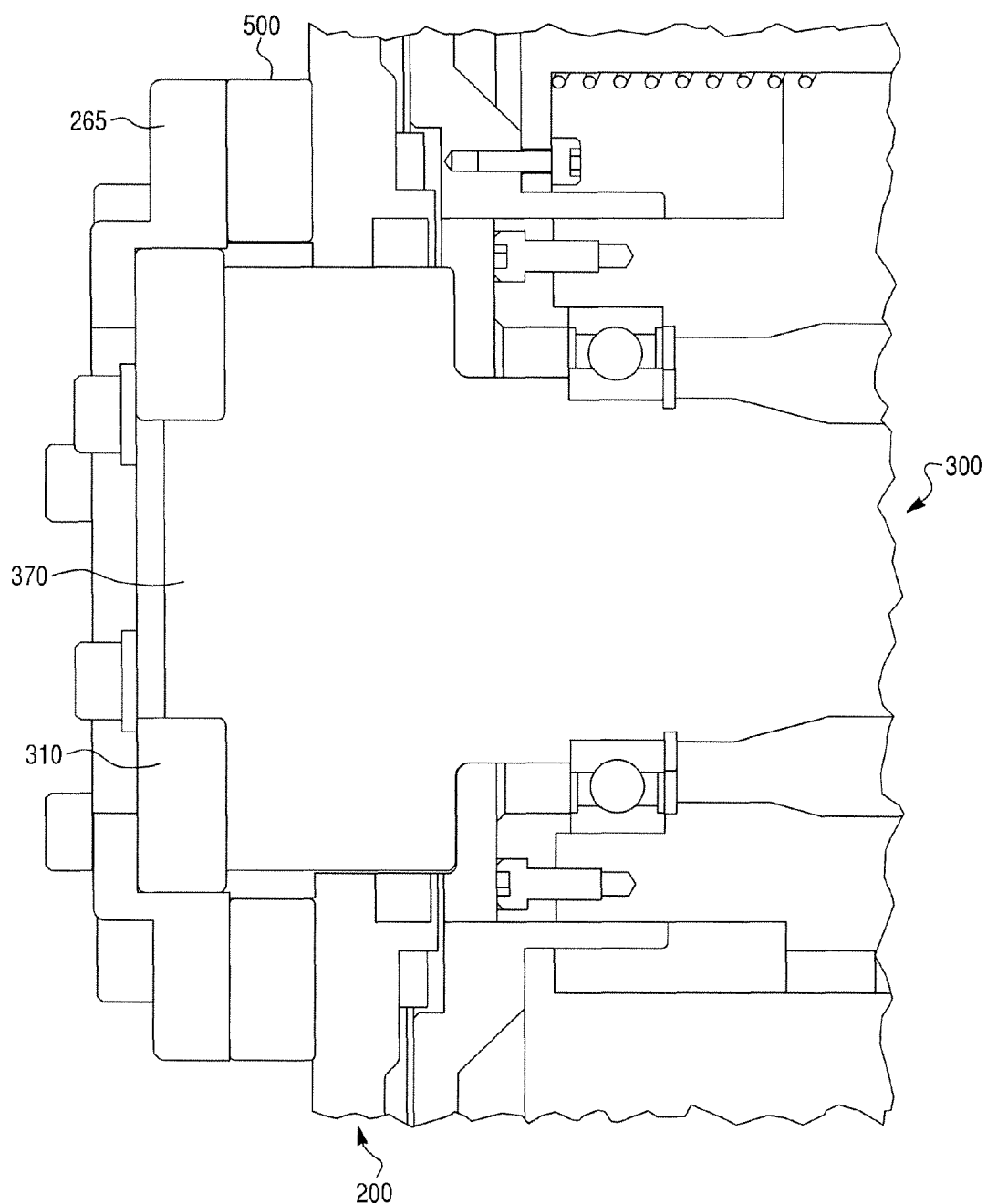
FIG. 8 presents a close-up view of some of the components depicted in FIG. 5.

Some embodiments include configurations where the turret assembly 152 is adapted to receive a first prefabricated spacer 500 when the starwheel assembly 200 is rotatably released from the shaft assembly 300. The spacer 500 is configured to adjust the position of the starwheel assembly 200 along the shaft assembly 300 so that the starwheel assembly 200 can accommodate containers 1000 of a different length. In an exemplary embodiment, the spacer 500 is a ring shaped component as shown in FIGS. 4 and 7, and is dimensioned/designed to position the starwheel assembly 200 along the shaft assembly 300 accurately, as detailed herein. When the prefabricated spacer 500 is secured to the turret assembly 152, the prefabricated spacer 500 is adapted to prevent the starwheel assembly 200 from moving to the mounting ring 265 of the mounting hub 260, and thus from moving to the third limit. That is, in some embodiments, with the introduction of the spacer 500, the starwheel assembly 200 now has a new third limit of travel, in-between the old third limit and the second limit, which is further inboard than the old third limit. When the starwheel assembly 200 is fixed at this new third limit of travel (as will be discussed in greater detail below), the position of the starwheel assembly 200 along the shaft assembly 300 will be such that the starwheel assembly 200 is fixed at a location "more inboard"/"less outboard" than if fixed at the old third limit of travel. This may be done, for example, when a shorter/smaller container and/or embryonic container is being necked in the necking machine. In an exemplary embodiment utilizing the spacer 500, the spacer 500 is adapted to fit over the starwheel retainer hub 310 to interface with the starwheel assembly 200 without removing the starwheel retainer hub 310 from the turret assembly.

By way of example only and not by way of limitation, the spacer 500 may be integrated into the alignment system as follows. As noted above, the starwheel assembly 200 includes dowel pins 204. In an exemplary embodiment, the retainer hub 310 fits into corresponding bores of the spacer 500, and the spacer 500 includes dowel pins 510 which fit into the bores of the mounting hub 260 (which would otherwise receive the dowel pins 204 of the starwheel assembly 200), as detailed above. Thus, the mounting hub 260 is rotationally linked to the starwheel assembly 200 via the spacer 500.

When the spacer 500 is utilized, longer bolts 380 may be used to permit the threads of the bolts 380 to pass through both the mounting hub 260 and the spacer 500. With the introduction of the spacer 500 between the starwheel assembly 200 and the hub 260, when the bolts 380 are tightened, the starwheel assembly 200 is clamped to the spacer 500, which in turn is clamped to the hub 260, and thus the starwheel assembly is prevented from moving in the inboard direction and the outboard direction, as the hub 260 is clamped to the retainer hub 310, which in turn is clamped to the shaft assembly 300.

It is noted at this time that the starwheel assembly 200 may be fixed or otherwise secured along the shaft assembly 300, whether or not the spacer 500 is located on the turret assembly 152. That is, in some embodiments, when the first prefabricated spacer 500 is secured to the turret assembly 152, the turret assembly 152 is adapted to stop the starwheel assembly 300 from moving in a direction away from the first limit when the starwheel assembly 300 is attached to the turret assembly 152. In this same embodiment, when the first prefabricated spacer 500 is absent from the turret assembly 152, the turret assembly 152 is adapted to stop the starwheel assembly 200 from moving in the direction away from the first limit when the starwheel assembly 200 is attached to the turret assembly 152. In some embodiments, when the first prefabricated spacer 500 is secured to the turret assembly 152 when the starwheel assembly 200 is in-between the third limit of travel of the starwheel assembly 200 and the second limit of travel of the starwheel assembly 200, and no other spacer or the like, coaxial to the first prefabricated spacer 500, and between the starwheel retainer hub 310 and the vacuum assembly 400 is secured to the turret assembly 152, the first prefabricated spacer 500 is thus used in conjunction with the hub 260 to prevent the starwheel assembly 200 from moving in a direction away from the first limit of travel.

Embodiments practicing the use of a spacer may be such that multiple prefabricated spacers 500 are available and used, these multiple spacers 500 being of different predetermined thicknesses, thus permitting the new third limit to be set at different distances from the old third limit, as desired. In some embodiments, multiple spacers may be used simultaneously, to create a stack-up of spacers establishing the new first limit as desired, while, in other embodiments, multiple spacers are provided, but single spacers are used individually to establish different new third limits as desired.

As noted above, the transfer turrets 152 may be positioned adjacent processing assemblies, such as a processing assembly including first processing turret 142, so that containers transferred from the transfer turret 152 may be necked. Specifically, in an exemplary embodiment, an adjacent processing assembly is adapted to releasably hold one or more containers and/or embryonic containers and rotate the one or more containers and/or embryonic containers about a rotation axis of the adjacent processing assembly when the one or more containers and/or embryonic containers are held by the processing assembly. This adjacent processing assembly may then transfer the one or more containers and/or embryonic containers to an adjacent transfer turret assembly. In an exemplary embodiment, the shaft assembly 300 of the turret assembly 152 includes the starwheel assembly alignment system which is adapted to permit rotational alignment of the starwheel assembly 200 relative to the shaft assembly 300 such that the starwheel assembly 200 can only be secured to the shaft assembly 300 with the starwheel assembly 200 in synchronization with the adjacent processing assembly to permit transfer of the containers from cradles (pockets) 255 of the transfer turret 152 to the cradles (pockets) of the processing turret 142, etc. In an exemplary embodiment, the starwheel assembly alignment system is adapted to rotationally align the starwheel assembly 200 relative to the shaft assembly 300 such that the starwheel assembly 200 can only be secured to the shaft assembly 300 at a predetermined number of precisely defined angles relative to each other. For example, the predetermined number of defined angles may be in a range of 0 to 18 degrees.

In an exemplary embodiment, the starwheel mounting hub 260 is part of the alignment system, as detailed above. The starwheel mounting hub 260 is adapted to be secured to the shaft assembly 300 through the retainer hub 310 and the starwheel assembly 200. The starwheel alignment system is adapted to align the starwheel mounting hub 260 with the shaft assembly 300, and align the starwheel mounting hub 260 with the starwheel assembly 200 to rotationally align the starwheel assembly 200 relative to the shaft assembly 300 such that the starwheel assembly 200 can only be secured to the shaft assembly 300 through the retainer hub 310 within a range of precisely defined angles relative to each other. Specifically, the slots 324 (FIG. 4) of the retainer hub 310, through which bolts 600 are fitted to secure the hub 260 (which is secured to the retainer hub 310) to the shaft assembly 300, permit the mounting hub 260 to slightly rotate relative to the shaft assembly 300—the slots 342 travel along the bolts 600—thus ensuring that the starwheel assembly 200 falls within the precisely defined range of angles.

In some embodiments, the starwheel assembly alignment system adapted to rotationally align the starwheel assembly 200 relative to the shaft assembly 300 such that the starwheel assembly 200 can only be secured to the shaft assembly 300 with the starwheel assembly 200 in approximate synchronization with the adjacent processing assembly such that an operator may easily manually adjust the starwheel assembly to more accurately synchronize it with the adjacent processing assembly, so that containers may travel from the cradles 255 of the starwheel assembly 200 to the cradles of the adjacent processing assembly and so that the containers in the adjacent processing assembly can travel from that processing assembly to the adjacent starwheel assembly 200. In this regard, in some embodiments, "approximate synchronization" corresponds to synchronization where the operator need only rotate the starwheel assembly 200 about the shaft assembly 300 by about 1 cradle 255 of the starwheel assembly 200 in either a clockwise rotation or a counterclockwise rotation, when viewed from the outboard side towards the inboard side, to achieve the more accuracely synchronization with the adjacent processing assembly. For example, 18 degrees of adjustment is equal to 1 cradle 255 (because 360 degrees divided by 20 cradles 255 of the starwheel assembly 200 equals 18 degrees). Alternatively, the starwheel assembly 200 may be rotated about the shaft assembly 300 by about 3 cradles 220, or any other suitable number of cradles such as, for example, 2 cradles, ¾ cradle, ½ cradle, ¼ cradle, 1/10 cradle.

In some embodiments, to achieve the more accurate synchronization, an operator utilizes a "blank," which is analogous to a can or bottle or other container that may be passed though the system, except dimensioned as necessary to achieve the more accurate synchronization. In this exemplary embodiment, a user may place the blank in-between an adjacent processing assembly and in a cradle 255 of the starwheel assembly 200 to determine that the starwheel assembly 200 is more accurately synchronized with the adjacent processing assembly. When the user is satisfied that the more accurate synchronization is achieved, the user tightens bolts 600 to lock the more accurately synchronized starwheel assembly 200 to the shaft assembly 300, thereby achieving the more accurately synchronized state.

An exemplary scenario of preparing the machine line 10 for necking containers according to an exemplary embodiment will now be described.

In an exemplary scenario, where the sequence of actions can be the same as or different than presented below, an operator approaches the machine line 10 with a need to adjust the position of the starwheel assembly 200 in the direction of the axis 206 of the transfer turret assembly 152 to process a new batch of containers having a length $L_{current}$. In this exemplary scenario, the starwheel assembly 200 is located, relative to the shaft assembly 300, in the position shown in FIG. 5, as the machine line 10 had previously processed a batch of containers having a length $L_{previous}$, $L_{previous}$ being longer than $L_{current}$, the hub 260 forming the third limit of travel of the starwheel 200 discussed above. The operator loosens and/or removes the pertinent bolts to permit the starwheel assembly 200 to be slid along the shaft assembly 300 in the direction of axis 206 away from the outboard end of the shaft assembly towards the vacuum assembly 400 (or, more specifically, towards the vacuum assembly housing 455), to about a location as shown in FIG. 6, to provide room for the spacer 500. The operator disconnects the starwheel mounting hub 260 from the turret assembly 152, and places the spacer 500 around the shaft assembly 300 by passing the spacer 500 over the retainer hub 310, the retainer hub 310 ensuring that the starwheel assembly 200 does not slide off the shaft assembly 200 by accident. The operator reattaches the mounting hub 260 while aligning the dowel pins of the starwheel assembly 200 with the bores in the spacer 500 and aligning the dowel pins of the spacer 500 with the bores in the starwheel mounting hub 260 and aligns the dowel pin 311 of the retainer hub 310 with the bore in the mounting hub 260. The operator slides the starwheel assembly 200 towards the outboard end of the turret to remove the gap between the spacer 500 and the mounting hub 260, the spacer 500 forming a new third limit of travel in the outboard direction. (See FIG. 7.) The pertinent bolts are tightened to clamp up the spacer 500 with the hub 260. If any alignment is needed, the operator obtains a blank alignment container and rotates the starwheel assembly 200, the spacer 500, the mounting hub 260 and the retainer hub 310 about the bearing surface (alignment cylinder) 370 of the shaft assembly 300 so that he or she may place the blank alignment container in-between the cradle 255 of the starwheel assembly 200 and the adjacent processing unit. Once the operator is satisfied that the starwheel assembly 200 is synchronized, the operator tightens the pertinent bolts, and then moves on to adjust the next starwheel assembly 200, as desired.

Given the disclosure of the present invention, one versed in the art would appreciate that there are other embodiments and modifications within the scope and spirit of the present invention. Accordingly, all modifications attainable by one versed in the art from the present disclosure within the scope and spirit of the present invention are to be included as further embodiments of the present invention.

What is claimed is:

1. A machine arrangement, comprising:
a vacuum transfer turret assembly adapted to releasably hold one or more containers and to rotate the one or more containers about a rotation axis of the vacuum transfer the turret assembly when the one or more containers are held by the vacuum transfer the turret assembly, wherein the vacuum transfer turret assembly includes:
a shaft assembly;
a starwheel assembly, wherein the starwheel assembly is releasably secured to the shaft assembly;
a vacuum manifold;
a vacuum assembly; and
a spacer, the spacer positioned between a starwheel mounting hub and the starwheel assembly, the spacer being configured to adjust the position of the starwheel assembly along the shaft assembly so the starwheel assembly can accommodate containers of different lengths,
wherein rotation of the shaft assembly is configured to rotate the starwheel assembly relative to the vacuum assembly when the starwheel assembly is secured to the shaft assembly,
wherein the starwheel assembly and the vacuum manifold are configured to move along the shaft assembly in a direction of the rotation axis of the vacuum transfer turret assembly towards and away from the vacuum assembly when the starwheel assembly is released from the shaft assembly and while the starwheel assembly is captured between the vacuum assembly and an outboard end of the vacuum transfer turret assembly, and
wherein the starwheel assembly is configured to move to accommodate containers of different lengths.

2. The machine assembly of claim 1, wherein when the starwheel assembly is released from the shaft assembly so that it may rotate and/or slide along the shaft assembly, the starwheel assembly and the vacuum manifold are configured to move along the shaft assembly in the direction of the rotation axis of the vacuum transfer turret assembly through a range of distances toward and away from an inboard end of the vacuum transfer turret assembly,
wherein a first end of the range of distances is set by a first limit of travel of the starwheel assembly along the shaft assembly relatively proximate to an outboard end of the vacuum transfer turret assembly, and
a second end of the range of distances is set by a second limit of travel of the starwheel assembly along the shaft assembly located inboard of the first limit of travel.

3. The machine assembly of claim 2, further comprising a starwheel retainer hub, and
wherein the first limit of travel of the starwheel assembly along the shaft assembly is set by the starwheel retainer hub mounted on an end of the shaft assembly opposite the vacuum assembly, and wherein the second limit of travel of the starwheel assembly along the shaft assembly is set by the vacuum assembly,
wherein the starwheel assembly includes a bore through which a shaft of the shaft assembly extends, and
wherein a diameter of the interior of the bore is smaller than an outer diameter of the starwheel retainer hub to retain the starwheel assembly on the shaft.

4. The machine assembly of claim 1, further comprising a starwheel retainer hub mounted to the spacer.

5. The machine assembly of claim 4, wherein the spacer is adapted to fit over the starwheel retainer hub to interface with the starwheel assembly without removing the starwheel retainer hub from the vacuum transfer turret assembly.

6. The machine assembly of claim 1, further including a processing assembly adjacent the vacuum transfer turret assembly, wherein the processing assembly is adapted to (i) releasably hold one or more containers, (ii) rotate the one or more containers about a rotation axis of the processing assembly when the one or more containers are held by the processing assembly, and (iii) transfer the one or more containers to the vacuum transfer turret assembly,
wherein the shaft assembly includes a starwheel assembly alignment system adapted to rotationally align the starwheel assembly relative to the shaft assembly such that the starwheel assembly can only be secured to the shaft assembly with the starwheel assembly in synchronization with the adjacent processing assembly to permit action "iii" to be executed.

7. The machine assembly of claim 6, wherein when the vacuum transfer turret assembly is aligned and synchronized with the adjacent processing assembly, cradles of the vacuum transfer turret assembly are synchronized with cradles of the adjacent processing assembly to permit containers in the cradles of the processing assembly to transfer to the cradles in the vacuum transfer turret assembly.

8. The machine assembly of claim 6, wherein the starwheel mounting hub is adapted to be rotationally secured to the shaft assembly and the starwheel assembly, wherein the starwheel alignment system is adapted to align the starwheel mounting hub with the shaft assembly, and align the starwheel mounting hub with the starwheel assembly to rotationally align the starwheel assembly relative to the shaft assembly such that the starwheel assembly can only be secured to the shaft assembly at a predetermined number of angles relative to each other.

9. The machine assembly of claim 6, further including a starwheel retainer hub, wherein the starwheel alignment system includes the starwheel retainer hub, wherein the starwheel retainer hub is provided with a dowel pin which fits into a bore of the starwheel mounting hub, wherein the starwheel assembly includes dowel pins which fit into corresponding bores of the starwheel mounting hub, wherein the starwheel retainer hub includes slots through which bolts are fitted to secure the starwheel mounting hub to the shaft assembly, wherein the slots permit synchronization of the starwheel assembly with the adjacent processing assembly by permitting the starwheel retainer hub to rotate, with the starwheel assembly, a limited amount in the counterclockwise and/or clockwise direction so that precise alignment of the starwheel assembly with the adjacent processing assembly may be achieved.

10. The machine assembly of claim 6, further including a starwheel retainer hub, wherein the starwheel alignment system includes the starwheel retainer hub, the starwheel retainer hub being provided with a dowel pin which fits into a bore of the starwheel mounting hub, wherein the starwheel assembly includes dowel pins which fit into corresponding bores of the spacer wherein the spacer includes dowel pins which fit into corresponding bores of the starwheel mounting hub, wherein the starwheel retainer hub is centered on an alignment cylinder of the shaft assembly, and wherein the starwheel mounting hub includes slots through which bolts are fitted to secure the starwheel mounting hub to the shaft assembly.

11. The machine assembly of claim 10, wherein the dowel pins are configured to maintain radial orientation of the starwheel assembly with the adjacent processing assembly when the spacer is removed or replaced with a different sized spacer, wherein radial orientation ensures that cradles of the starwheel assembly are synchronized with cradles of the adjacent processing assembly.

12. The machine assembly of claim 1, further comprising a starwheel retainer hub, wherein the spacer includes a bore through which the shaft assembly extends, and wherein a diameter of the interior of the bore of the spacer is larger than the outer diameter of the starwheel retainer hub to permit the spacer to slide over the retainer hub when the starwheel retainer hub is secured to the shaft assembly.

13. The machine assembly of claim 1, wherein the vacuum assembly includes a vacuum housing, the vacuum manifold and vacuum tubes connecting the vacuum housing to the vacuum manifold, the vacuum assembly being adapted to permit the vacuum tubes to slide into the vacuum housing with movement of the vacuum manifold due to movement of the starwheel assembly, and wherein the vacuum manifold is adapted to provide a suction, through the vacuum manifold and the vacuum tubes, at a plurality of orifices in respective container cradles of the starwheel assembly sufficient to hold a container in one of the container cradles.

14. A method, comprising:

identifying a vacuum transfer turret assembly of a machine adapted to process containers, the vacuum transfer turret assembly including a starwheel assembly and a shaft assembly, wherein the starwheel assembly is secured to the shaft assembly at a first location relative to the shaft assembly such that the starwheel assembly does not move relative to the shaft assembly;

releasing the starwheel assembly from the shaft assembly so that the starwheel assembly can slide in an axial direction of the shaft assembly relative to the shaft assembly and can rotate relative to the shaft assembly while the starwheel assembly is retained on the shaft assembly;

moving the starwheel assembly inboard in the axial direction of the shaft assembly a first distance from the first location;

placing a spacer on the shaft assembly so that the spacer is positioned outboard of the vacuum transfer turret assembly with respect to the starwheel assembly; and securing the starwheel assembly to the shaft assembly by imparting a clamping force between a starwheel mounting hub, the spacer and the starwheel assembly to secure the starwheel assembly at a second location relative to the shaft assembly further inboard than the first location.

15. The method of claim 14, wherein the action of securing the starwheel assembly to the shaft assembly includes:

loosely attaching the starwheel assembly to the shaft assembly so that travel in the axial direction and rotation about the shaft assembly of the starwheel assembly is substantially limited as compared to travel and rotation prior to the securing action;

synchronizing the starwheel assembly with an adjacent processing assembly so that the containers may be automatically transferred from the starwheel assembly to the adjacent processing assembly; and tightly attaching the starwheel assembly to the shaft assembly so that travel in the axial direction and rotation about the shaft assembly of the starwheel assembly is prevented.

16. The method of claim 14, wherein the action of synchronizing the starwheel assembly with an adjacent processing assembly includes:

after loosely attaching the starwheel assembly to the shaft assembly, rotating the starwheel assembly relative to the shaft assembly so that a blank alignment container may be placed in-between a cradle of the starwheel assembly and the adjacent processing assembly.

\* \* \* \* \*